United States Patent [19]

Saeks

[11] Patent Number: 4,813,550

[45] Date of Patent: Mar. 21, 1989

[54] APPARATUS FOR STORING ATHLETIC EQUIPMENT OR THE LIKE

[76] Inventor: Ford Saeks, 2627 South Emporia, Suite 506, Wichita, Kans. 67216

[21] Appl. No.: 148,343

[22] Filed: Jan. 25, 1988

[51] Int. Cl.$^4$ .............................................. A47F 7/00
[52] U.S. Cl. ....................................... 211/17; 211/86; 211/22; 211/190; 211/208
[58] Field of Search ....................... 211/17, 22, 86, 89, 211/190, 208; 248/161, 407, 354.1, 354.5, 354.6, 188.4, 188.9

[56] References Cited

U.S. PATENT DOCUMENTS

| | | | |
|---|---|---|---|
| 2,254,973 | 9/1941 | Nalle | 248/188.4 X |
| 3,031,689 | 5/1962 | Sark | 248/188.4 X |
| 3,291,434 | 12/1966 | Whitechester | 211/86 X |
| 4,116,341 | 9/1978 | Hebda | 211/17 |
| 4,380,298 | 4/1983 | Harig | 211/190 X |
| 4,552,270 | 11/1985 | Lentz et al. | 211/22 X |
| 4,706,915 | 11/1987 | Cindric et al. | 248/161 X |

Primary Examiner—Robert W. Gibson, Jr.
Attorney, Agent, or Firm—John Wade Carpenter

[57] ABSTRACT

An apparatus for holding athletic equipment having a stanchion member with a pair of outside standards and an intermediate standard to form a pair of longitudinal openings. A bifurcated member is provided having a pair of brackets. The pair of brackets slidably lodge in the pair of longitudinal openings such that the bifurcated member slidably engages the stanchion member. A support is secured to the stanchion member for supporting and retaining athletic equipment off of the ground.

12 Claims, 4 Drawing Sheets 4,813,550

1

APPARATUS FOR STORING ATHLETIC EQUIPMENT OR THE LIKE

FIELD OF THE INVENTION

The present invention relates to a system for the storage of athletic equipment such as bicycles, skis, and the like.

DESCRIPTION OF THE PRIOR ART

A patentability investigation was conducted and the following U.S. patents were discovered: U.S. Pat. No. 610,656 by Martin; U.S. Pat. No. 3,976,200 by Munns; U.S. Pat. No. 615,995 by Leonard; and U.S. Pat. No. 4,116,341 by Hebda. None of the foregoing prior art teaches or suggests the particular storage system of this invention.

SUMMARY OF THE INVENTION

The present invention broadly accomplishes its desired objects by broadly providing a storage system for holding athletic equipment and the like. The storage system broadly provides a stanchion means having a pair of outside standards and an intermediate standard disposed between the pair of outside standards to form a first longitudinal opening and a second longitudinal opening between the intermediate standard and the pair of outside standards. A bifurcated height adjustment member is provided comprising a first bracket and a second bracket spaced from the first bracket. The first bracket and the second bracket are respectively slidably disposed within the first longitudinal opening and the second longitudinal opening. The storage system further broadly comprises a means for securing the bifurcated height adjustment member to the stanchion means after the first bracket and the second bracket are respectively in a desired position within the first longitudinal opening and the second longitudinal opening, and at least one means, connected to said stanchion means, for supporting and retaining a bicycle off the ground.

It is therefore an object of the present invention to provide an apparatus or storage system for holding athletic equipment such as bicycles, skis and the like.

These, together with the various ancillary objects and features which will become apparent to those skilled in the art as the following description proceeds, are attained by this novel apparatus for holding athletic equipment, a preferred embodiment being shown with reference to the accompanying drawings, by way of example only, wherein:

DETAILED DESCRIPTION OF THE INVENTION

Figure 1:
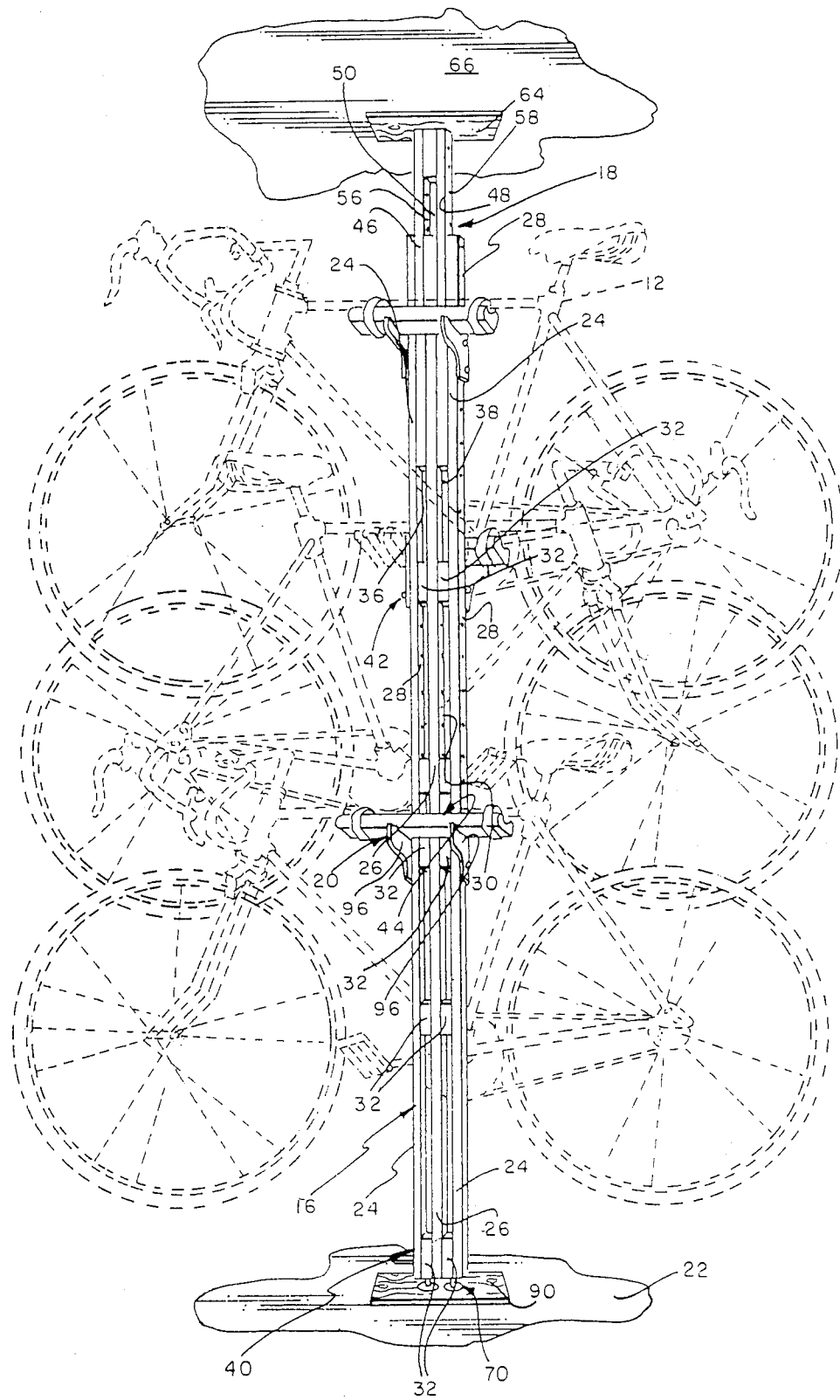
FIG. 1 is an exploded perspective view of the apparatus for storing athletic equipment or the like with a plurality of bicycles illustrated as dotted lines and mounted on the apparatus.

Referring in detail now to the drawings wherein similar parts of the invention are identified by like reference numerals, there is seen an apparatus (or storage system), generally illustrated as 10, for storing athletic equipment, such as a bicycle 12, skis 14, and the like. The apparatus 10 comprises a stanchion means, generally illustrated as 16; a bifurcated height adjustment member, generally illustrated as 18; and a means, generally illustrated as 20, for retaining and supporting the bicycle 12 off of or at a distance from a ground or floor 22.

Figures 2, 3:
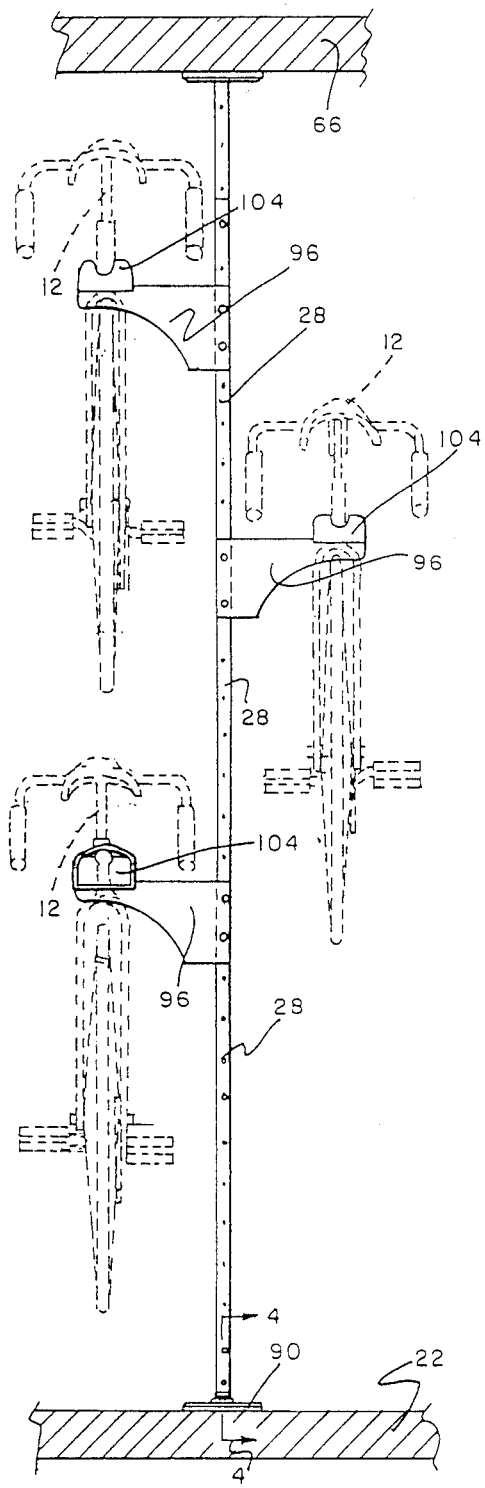
FIG. 2 is a side elevational view of the apparatus of FIG. 1.
FIG. 3 is a partial perspective view of the bifurcated height adjustment member.
Figure 4:
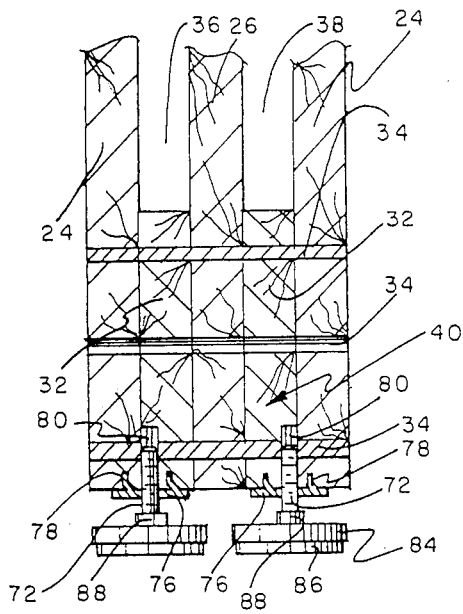
FIG. 4 is a vertical sectional view of the apparatus taken in direction of the arrows and along the plane of line 4—4 in FIG. 2.
Figure 6:
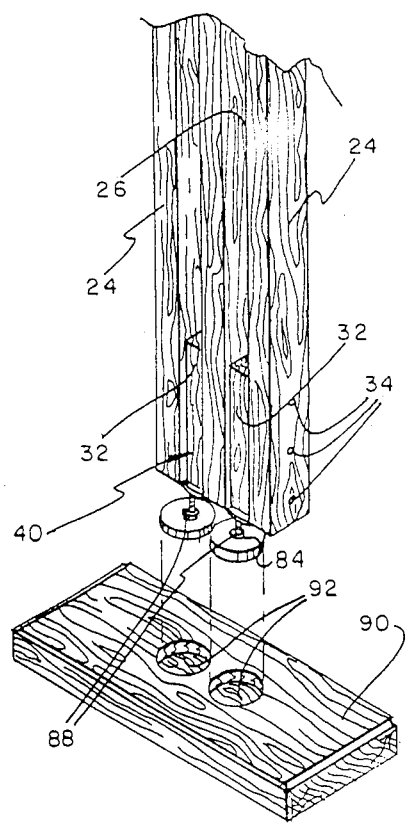
FIG. 6 is a partial perspective view of the lower portion of the stanchion member a foot plate having a pair of recesses to receive a pair of threaded feet adjustably secured to the stanchion.

The stanchion means 16 has a pair of outside standards 24—24 and an intermediate standard 26. Each of the outside standards 24 has a plurality of apertures 28 transversely extending therethrough. The intermediate standard 26 includes a plurality of apertures 30 that also transversely extend therethrough as best shown in FIGS. 1 and 3. Apertures 28 and 30 are generally coaxial and are aligned with respect to a horizontal plane. Spacer braces 32 are disposed between the intermediate standard 26 and each of the outside standards 24. The spacer braces 32, as best shown in FIGS. 4 and 6, are connected to the pair of outside standards 24—24 and the intermediate standard 26 by bolts or dowells 34 which pass entirely through the outside standards 24—24, the intermediate standard 26, and all of the spacer braces 32 disposed between the outside standards 24 and the intermediate standard 26. The spacer braces 32 maintain a space 36 between one outside standard 24 and the intermediate standard 26, and a space 38 between the other outside standard 24 and the intermediate standard 26. In a preferred embodiment of the invention, there are three pairs of spacer braces 32—32, a lower pair 40 and an upper pair 42 and an intermediate pair 44, all as best shown in FIG. 1.

The bifurcated height adjustment member 18 comprises adjustment brackets 46 and 48 which are in a spaced relationship with respect to each other by a space 50. Space 50 is maintained and is defined by the width of an adjustment spacer 52 which is disposed or sandwiched between adjustment brackets 46 and 48. As shown in FIG. 3, spacer 52 is interconnected to brackets 46 and 48 by bolts or dowells 54—54 which pass entirely through brackets 46 and 48 and the spacer 52, similarly to the manner that bolts 34 pass through outside standards 24—24, intermediate standard 26, and the spacer braces 32 as illustrated in FIG. 4. Brackets 46 and 48 respectively have a structure defining apertures 56 and 58 which transversely pass entirely through the respective brackets in a coaxial manner such as to be aligned in a horizontal plane. Brackets 46 and 48 are slidably disposed in space 36 and 38 as shown in FIG. 3 such that apertures 56 and 58 register with apertures 28 and 30. When the brackets 46 and 48 have been positioned in spaces 36 and 38 respectively at a desired location, the bifurcated height adjustment member 18 may be releasably secured to the stanchion means 16 by slidably passing a bolt 60 through aperture 28 of one outside standard 24, aperture 56 of bracket 46, aperture 30 of intermediate standard 26, aperture 58 of bracket 48, and aperture 28 of the other outside standard 24, in the order stated, and securing the available end of the bolt 60 with nut 62. Thus, the bolt 60 and nut 62 provide a means for not only securing the bifurcated height adjustment member 18 to the stanchion means 16, but for also adjusting the distance that the brackets 46 and 48 extend out or away from spaces 36 and 38 respectively. Stated alternatively, the distance that the bifurcated height adjustment member 18 extends away from the top of the stanchion means 16 can be controlled by which particular apertures 56 and 58 along the respective structures of brackets 46 and 48 receive the bolt 60. An overload plate 64 may be mounted to the brackets 46 and 48 of the bifurcated height adjustment member 18. It should be pointed out that overhead plate 64 is not absolutely necessary for operation of the apparatus 10, but may be employed for contact with a ceiling 66 or other contacting surface.

Figure 5:
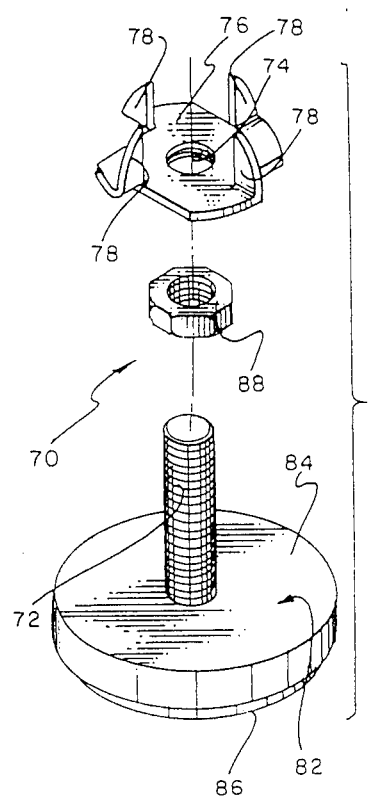
FIG. 5 is a segmented enlarged perspective view of a threaded foot member.

A threaded foot member, generally illustrated as 70 (see FIGS. 4 and 5), is secured to each of the spacer braces 32 of the lower pair 40 of spacer braces 32—32. Each threaded foot member 70 comprises a threaded shaft 72 that rotatably and threadably engages an aperture 74 of a bearing plate 76. Bearing plate 76 has a plurality of prongs 78 projecting therefrom for inserting into the lower end of the outside standards 24—24 and the lower pair 40 of spacer braces 32—32 which include a drilled opening 80 for receiving the portion of the threaded shaft 72 after it has passed through aperture 74. A rounded support, generally illustrated as 82, is threadably disposed at the end of the threaded shaft 72 opposite the end that passes into drilled opening 80. Rounded support 82 preferably comprises an upper support 84 and a lower support 86 integrally bound to the upper support 84. A nut 88 is threaded around shaft 72 to be flanged against the upper support 84 to lock the rounded support and prevent the same from rotating off or becoming unsecured from the end of the threaded shaft 72. A foot plate 90, with a pair of support recesses 92—92 for receiving the rounded supports 70—70, may be disposed on the floor 22 or other contacting surface for supporting the weight of the apparatus 10. It should be pointed out that as was seen for overhead plate 64, foot plate 90 is not absolutely necessary for operation of the apparatus 10 as the threaded foot members 70—70 alone are sufficient. As is obvious from FIG. 4 of the drawings, each threaded foot member 70 may be adjusted independently of each other for adjusting the height of the apparatus 10 to insure a snug fit for the apparatus 10 between a floor 22 and a ceiling 66, and to further insure that the apparatus 10 remains in an upright position.

Figure 7:
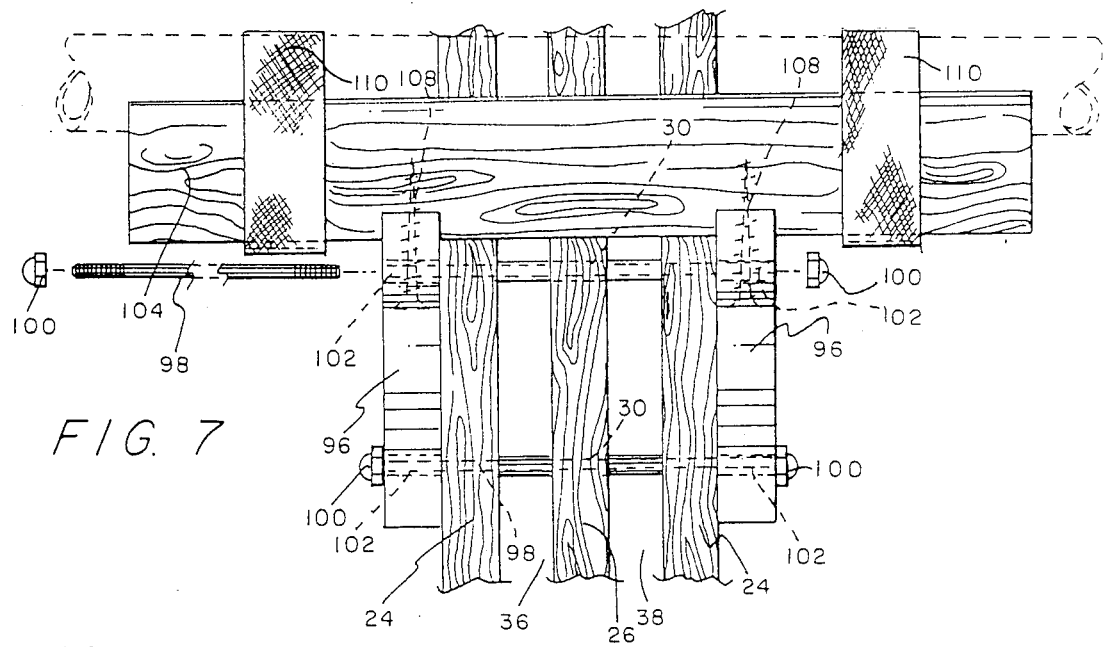
FIG. 7 is an exploded front elevational view of a support for holding a bicycle.
Figure 8:
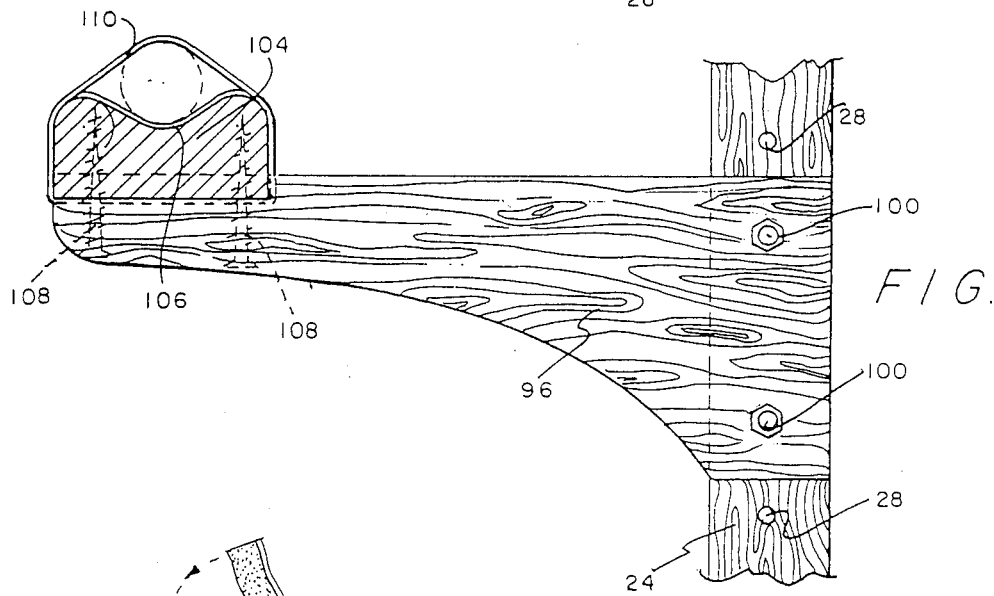
FIG. 8 is a side elevational view of the support of FIG. 7.
Figure 9:
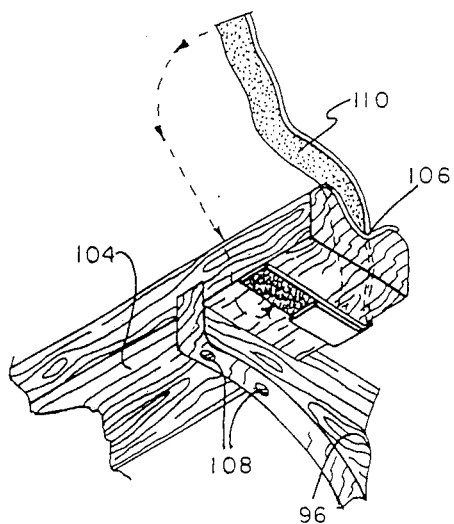
FIG. 9 is a partial perspective view of an end of the support of FIG. 7 and illustrating the VELCRO® strap which secures underneath the support after the frame of the bicycle has been mounted in an arcuate channel of the support.

The means 20 for retaining and supporting a bicycle 12 off of or at a distance from a ground or floor 22 preferably comprises a pair of shelf brackets 96—96 that are adjustably secured at predetermined positions or places to the outside of the outside standards 24—24 by rods 98—98 threaded on both ends for threadably receiving nuts 100—100. Each of the brackets 96 have a pair of longitudinal openings 102—102 wherethrough rods 98—98 slidably pass. A bicycle holder 104 having an arcuate channel 106 is mounted to the ends of the brackets 96—96 by screws 108—108. A VELCRO® strap means 110 is secured to each end of the holder 104 as illustrated in FIGS. 7-9 to secure part of the frame of the bicycle 12 to and within the arcuate channel 106. The openings 102—102 register with any given pair of apertures 28—28 of the outside standards 24 and any given pair of apertures 30—30 of intermediate standard 26 such that the height from the floor 22 o the means 20 for retaining and supporting can be adjusted by moving the brackets 96—96 along the outside of the outside standards 24 until the desired height is obtained, and subsequently passing rods 98—98 through apertures 102—102, apertures 28—28 of one outside standard 24, apertures 30—30 of intermediate standard 26, and apertures 28—28 of the second or other outside standard 24. A pair of nuts 100—100 can be secured to the threaded ends of each of the rods 98—98 to insure that the rods 98—98 remain in place. In a preferred embodiment of the invention, any number of means 20 for retaining and supporting a bicycle 12 may be employed on one or both sides of the stanchion means 16, such as two means 20 for retaining and supporting on one side and a single means 20 for retaining and supporting on the other side of the stanchion means 16 as clearly illustrated in FIG. 2.

Referring in detail now to the drawings for operation of the invention, the stanchion means 16 is initially stood at a normal position with respect to the floor 22 such that the threaded feet members 70—70 are supported by the foot plate 90, and the bifurcated height adjustment member 18 is subsequently elevated, with adjustment brackets 46 and 48 sliding respectively within slots 36 and 38, until the overhead plate 64 is in contact with the ceiling 66. The bolt 60 is passed slidably through one of the apertures 28 (preferably the uppermost) of one of the outside standards 24, through one of the apertures 56 of bracket 46, through one of the apertures 30 (preferably the uppermost) of the intermediate standard 26, through one of the apertures 58 of bracket 48, and through one of the apertures 28 (preferably the uppermost) of the other outside standard 24. As was previously mentioned, apertures 28 of outside standards 26—26 and aperture 30 of intermediate standard 26 are all aligned and coaxial, and apertures 56 and 58 respectively of brackets 46 and 48 can be positioned to also be coaxial and aligned with apertures 28 and aperture 30, thus enabling the passage of bolt 60 therethrough for the securing of the bifurcated height adjustment member 18 to the stanchion means 16. The threaded feet members 70—70 may now be adjusted independently of each other to ensure a snug fit between the floor 22 and the ceiling 66 by rotating the rounded support 82 either clockwise or counterclockwise (depending if the force of the snug fit is to be increased or lowered) in threaded aperture 74.

As was previously indicated, any number of means 20 for retaining and supporting a bicycle 12 may be adjustably and movably secured to the pair of outside standards 24—24 (either on one side or both sides) in a manner that was previously explained. After one or more means 20 for retaining a bicycle 12 has been positioned at a desired height on the stanchion means 16 above the floor 22, a bicycle 12 may be disposed in the arcuate channel 106 of each bicycle holder 104 for storing a bicycle 12.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

What is claimed is:

1. A storage system for holding athletic equipment and the like, comprising:
    a stanchion means having a pair of outside standards and an intermediate standard disposed between said pair of outside standards to form a first longitudinal opening and a second longitudinal opening between the intermediate standard and the pair of outside standards;
    a bifurcated height adjustment member comprising a first bracket and a second bracket spaced from said first bracket, said first bracket and said second bracket are respectively slidably disposed within said first longitudinal opening and said second longitudinal opening;
    means for securing the bifurcated height adjustment member to the stanchion means after the first bracket and the second bracket are respectively in a desired position within said first longitudinal opening and said second longitudinal opening; and at least one means, connected to said stanchion means, for supporting and retaining a bicycle off the ground.

2. The storage system of claim 1 additionally comprising at least one first spacer brace disposed within said first longitudinal opening and at least one second spacer brace disposed within said second longitudinal opening, said first and second spacer brace interconnecting said intermediate standard to said outside standards and maintaining the intermediate standard in a spaced relationship with respect to said outside standards.

3. The storage system of claim 2 comprising three of said first spacer braces disposed in said first longitudinal opening, and three of said second spacer braces disposed in said second longitudinal opening generally directly opposite said first spacer braces such as to form a lower pair of first and second spacer braces, an intermediate pair of first and second spacer braces, and an upper pair of first and second spacer braces.

4. The storage system of claim 2 wherein each of said outside standards has a structure defining a plurality of outside standard apertures such that the outside standard apertures of one outside standard registers with the outside standard apertures of the other outside standard; and said intermediate standard has a structure defining a plurality of intermediate apertures.

5. The storage system of claim 4 wherein said first bracket has a structure defining a plurality of first apertures and said second bracket has a structure defining a plurality of second apertures that register with said first apertures, and said first apertures and said second apertures register with the outside standard apertures and with the intermediate apertures.

6. The storage system of claim 5 wherein said means for securing the bifurcated height adjustment member to the stanchion means comprises a bolt member slidably passing through an outside standard aperture of both outside standards and through said first and said second apertures and through said intermediate apertures.

7. The storage system of claim 6 additionally comprising a pair of threaded foot means secured to the lower pair of said lower braces.

8. The storage system of claim 7 wherein each of said threaded foot means comprises a bearing plate having a structure defining a plurality of prongs that insert into the lower end of the outside standard, said bearing plate having a structure defining a threaded aperture; a threaded shaft threadably passing through said threaded aperture; and a rounded support bound to an end of said threaded shaft.

9. The storage system of claim 8 wherein said means for supporting and retaining a bicycle off the ground comprises a pair of shelf brackets releasably secured to the outside standards through said outside standard apertures, and a bicycle holder having a structure defining an arcuate recess and secured to the ends of said shelf brackets.

10. The storage system of claim 9 additionally comprising a VELCRO ® strap means secured to said bicycle holder.

11. The storage system of claim 10 additionally comprising an overhead plate means bound to the top of the bifurcated height adjustment member.

12. The storage system of claim 11 additionally comprising a base plate for supporting the weight of the storage system.

* * * * *